(12) United States Patent
Kurosawa

(10) Patent No.: US 7,606,483 B2
(45) Date of Patent: Oct. 20, 2009

(54) ELECTROLUMINESCENT DISPLAY DEVICE AND A DIGITAL CAMERA USING AN ELECTROLUMINESCENT DISPLAY DEVICE

(75) Inventor: Yuichi Kurosawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 359 days.

(21) Appl. No.: 11/459,158

(22) Filed: Jul. 21, 2006

(65) Prior Publication Data

US 2007/0019942 A1    Jan. 25, 2007

(30) Foreign Application Priority Data

Jul. 25, 2005    (JP)    ............................. 2005-214991

(51) Int. Cl.
*G03B 17/00*    (2006.01)

(52) U.S. Cl. .................. 396/299; 396/287; 396/540; 345/33; 345/36; 345/173

(58) Field of Classification Search ......... 396/287–296, 396/281, 299, 540; 345/33, 36, 79
See application file for complete search history.

(56) References Cited

U.S. PATENT DOCUMENTS

| | | | | |
|---|---|---|---|---|
| 5,408,287 A | * | 4/1995 | Winegarden et al. | 396/502 |
| 5,557,295 A | * | 9/1996 | Miyashita et al. | 345/36 |
| 5,680,160 A | * | 10/1997 | LaPointe | 345/173 |
| 6,067,074 A | * | 5/2000 | Lueders | 345/156 |
| 6,468,676 B1 | * | 10/2002 | Ueda et al. | 428/690 |
| 6,567,618 B2 | * | 5/2003 | Kai et al. | 396/299 |
| 6,751,898 B2 | * | 6/2004 | Heropoulos et al. | 40/544 |
| 6,788,887 B2 | * | 9/2004 | Takeshita et al. | 396/6 |
| 6,801,174 B2 | * | 10/2004 | Kayama et al. | 345/76 |
| 6,842,170 B1 | * | 1/2005 | Akins et al. | 345/173 |
| 6,982,760 B1 | * | 1/2006 | Honda et al. | 348/333.02 |
| 7,105,760 B2 | * | 9/2006 | Zensai | 200/341 |
| 7,205,958 B2 | * | 4/2007 | Yamazaki | 345/1.1 |
| 2002/0003595 A1 | | 1/2002 | Yazawa | |

FOREIGN PATENT DOCUMENTS

JP    2005-063413    3/2005

\* cited by examiner

*Primary Examiner*—Rodney E Fuller
*Assistant Examiner*—Linda B Smith
(74) *Attorney, Agent, or Firm*—Greenblum & Bernstein, P.L.C.

(57) ABSTRACT

An electroluminescent display device includes an electroluminescent display, and at least one switch which is positioned adjacent to an inner surface of the electroluminescent display, the switch being activated upon an outer surface of the electroluminescent display being pressed to resiliently deform the switch.

15 Claims, 12 Drawing Sheets

ELECTROLUMINESCENT DISPLAY DEVICE AND A DIGITAL CAMERA USING AN ELECTROLUMINESCENT DISPLAY DEVICE

BACKGROUND OF THE INVENTION

1. Field of the Invention

The present invention relates to an electroluminescent display device and a camera which incorporates an electroluminescent display device used as a monitoring device, and more specifically relates to a digital camera which incorporates an enlarged monitoring device for displaying object images.

2. Description of the Prior Art

LCDs (liquid crystal displays) are used as monitoring devices (LCD monitors) in digital cameras which are available on the market at the present time. Since the monitoring device is usually provided on the back of the camera though various operating switches that the user manually operates while looking through the monitoring device are also provided on the back of the camera, there is no other choice but to positioned the monitoring device on an area on the back of the camera which does not interfere with such various operating switches. Accordingly, there is a limit to how much the size of the monitoring device can be enlarged without increasing the size of the camera. Specifically in recent years, it has become more and more difficult to enlarge the display screen size of the monitoring device because miniaturization of the camera has continued to advance. Therefore, it is difficult to frame and display the object image on the monitoring device and to visually check the focus state of the displayed object image. Additionally, although various setting screens (e.g., mode setting icons) are indicated on the monitoring device so that a desired mode such as a photographing mode can be selected from among various modes, letters and characters displayed on the monitoring device are so small that they cannot be easily read, and accordingly, the setting operation for the mode selection is difficult.

It is possible for a touch panel to be used to overcome this problem. As an input device used for cellular phones, an input device in which an EL (electroluminescent) display and a touch panel are laminated so that the EL display is overlaid onto the touch panel to allow the user to turn on operating switches of the underlying panel by pressing corresponding portions of the surface of the EL display by the user's finger or the like. If this type of input device is used, letters, characters and the like can be displayed largely on the EL display so that various setting operations such as mode setting operations (mode selecting operations) can be easily carried out.

Japanese unexamined patent publication No. 2005-63413 discloses an input device which is limited to a technology for displaying indications which correspond to operating switches of a touch panel. Therefore, if this technique is applied to a digital camera, the operability of various operating switches can be improved, the area on the camera which is occupied by the various operating switches can be reduced by constructing these operating switches using an EL display, and the reduction in area occupied by the various operating switches is advantageous for enlarging a monitoring device thereof. However, since no object images can be displayed on the input device disclosed in the Japanese unexamined patent publication No. 2005-63413, there is still no monitoring device that can be arranged on at least the area in which the input device is arranged. Moreover, it is difficult to enlarge the area of the monitoring device over the entire back surface of the camera to enlarge the monitoring device while achieving miniaturization of the camera. In addition, when the photographer (user) touches a surface of the touch panel by their finger to actuate a switch on the touch panel, the photographer cannot feel a tactile "click," response from the touch panel, and accordingly, the photographer cannot perceive the activation of the switch through their finger, and sometimes the switch is not activated due to an inadequate contact, which may have an adverse effect on the photographer's confidence in achieving a desired photographing operation.

SUMMARY OF THE INVENTION

The present invention provides an electroluminescent display device which can serve as not only a monitoring device but also a touch panel having tactile feedback, and further provides a digital camera which adopts this electroluminescent display device configured to serve as a monitoring device to allow enlargement of the monitoring device.

According to an aspect of the present invention, an electroluminescent display device is provided, including an electroluminescent display; and at least one switch which is positioned adjacent to an inner surface of the electroluminescent display, the switch being activated upon an outer surface of the electroluminescent display being pressed to resiliently deform the switch.

It is desirable for the electroluminescent display to be flexible so that in the case where the outer surface of the electroluminescent display is depressed, a depressed portion thereof is deformed so that an inner surface of the depressed portion operates the switch.

It is desirable for the electroluminescent display to display a predetermined indication at an area at which the switch is operated upon the depressed portion of the electroluminescent display being depressed.

It is desirable for the predetermined indication to indicate a function in accordance with the switch which is operated.

It is desirable for the electroluminescent display device to be incorporated in a digital camera to serve as a monitoring device for displaying object images captured via an image pickup device, and for the flexible electroluminescent display to extend over substantially an entire surface of a camera body.

It is desirable for the flexible electroluminescent display to display information on various modes and a function of the switch in addition to the object images.

It is desirable for the switch to include an insulating substrate; at least one switch pad formed on a surface of the insulating substrate; and a resiliently deformable switch member which is resiliently deformed to come in contact with the switch pad when the resiliently deformable switch member is depressed toward the switch pad.

It is desirable for the digital camera to include a right release button and a left release button provided on right and left portions of the camera body, respectively, wherein the right release button and the left release button are selectively enabled, and an indication pattern of the monitoring device is changed to correspond to one of the right release button and the left release button which is enabled.

It is desirable for the digital camera to include a dominant-hand setting operation in which one of the right release button and the left release button is manually enabled.

It is desirable for the flexible electroluminescent display to display a function of the switch on a right-sided portion in a display area of the monitoring device while the right release button is enabled, wherein the right release button is provided on a right side of the camera body with respect to a back side of the camera body, and for the flexible electroluminescent display to display a function of the switch on a left-sided portion in the display area of the monitoring device while the left release button is enabled, wherein the left release button that is positioned on a left side of the camera body as viewed from the back side of the camera body.

It is desirable for one of the right release button and the left release button to be enabled when the digital camera is in a self-portrait mode, and for the enabled one of the right release button and the left release button to be visually distinguished from the other of the right release button and the left release button.

It is desirable for each of the right release button and the left release button to include a light emitter, and for the light emitter of one of the right release button and the left release button which is enabled to be made to emit light.

It is desirable for each of the right release button and the left release button to include a second flexible electroluminescent display and a switch positioned adjacent to an inner surface of the second flexible electroluminescent display, and for the second flexible electroluminescent display of one of the right release button and the left release button which is enabled to be made to display an indication indicating that the one of the right release button and the left release button is currently enabled.

It is desirable for an inner layer of the flexible electroluminescent display adjacent to the switch to be made of an opaque material.

It is desirable for the resiliently deformable switch member to include a dome-shaped tactile member.

It is desirable for each of the right release button and the left release button to include a push button member made of a translucent resin, and a light emitter which illuminates the push button member when associated one of the right release button and the left release button is enabled.

It is desirable for the right release button and the left release button to be provided on the top of the camera body, and for the electroluminescent display to be provided on the back of the camera body.

It is desirable for the camera to includes a self-portrait mirror fixed to a front surface of the camera body.

According to the present invention, the user can perceive the activation of the switch via finger contact because a contact of the switch is resiliently deformed to turn the switch ON and OFF when the user activates the switch by pressing a surface of the electroluminescent display, which allows reliable activation of the switch. Moreover, if the camera body is miniaturized, a significant reduction in size of the monitoring device can be avoided, or no reduction in the size of the monitoring device may be necessary at all, which makes it easy for the user to frame the object image while looking through the monitoring device and also makes it easy for the user to visually check the focus of reproduced object images. Furthermore, since various operating switches are made using indications of the monitoring device, the various operating switches can be arranged to be sufficiently spaced from one another, which improves the operability of the various operating switches and makes it possible to largely display of the various operating switches on the monitoring device so as to be easily read.

Furthermore, according to the present invention, since the right release button and the left release button, which are selectively enabled by changing settings of the release buttons, are provided on right and left portions of the camera body, respectively, photographing is not dependent on the dominant hand of the photographer; moreover, the operability of the camera can be improved even in the case of taking self-portrait pictures while the operability of various operating switches such as mode select switches can be improved. In this case, changing the indication pattern of the monitoring device to correspond to the enabled right or left release button improves the operability of the various operating switches and further allows live images (moving images) and reproduced images to be easily viewed by the monitoring device.

The present disclosure relates to subject matter contained in Japanese Patent Application No. 2005-214991 (filed on Jul. 25, 2005) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

First Embodiment

Figure 1:
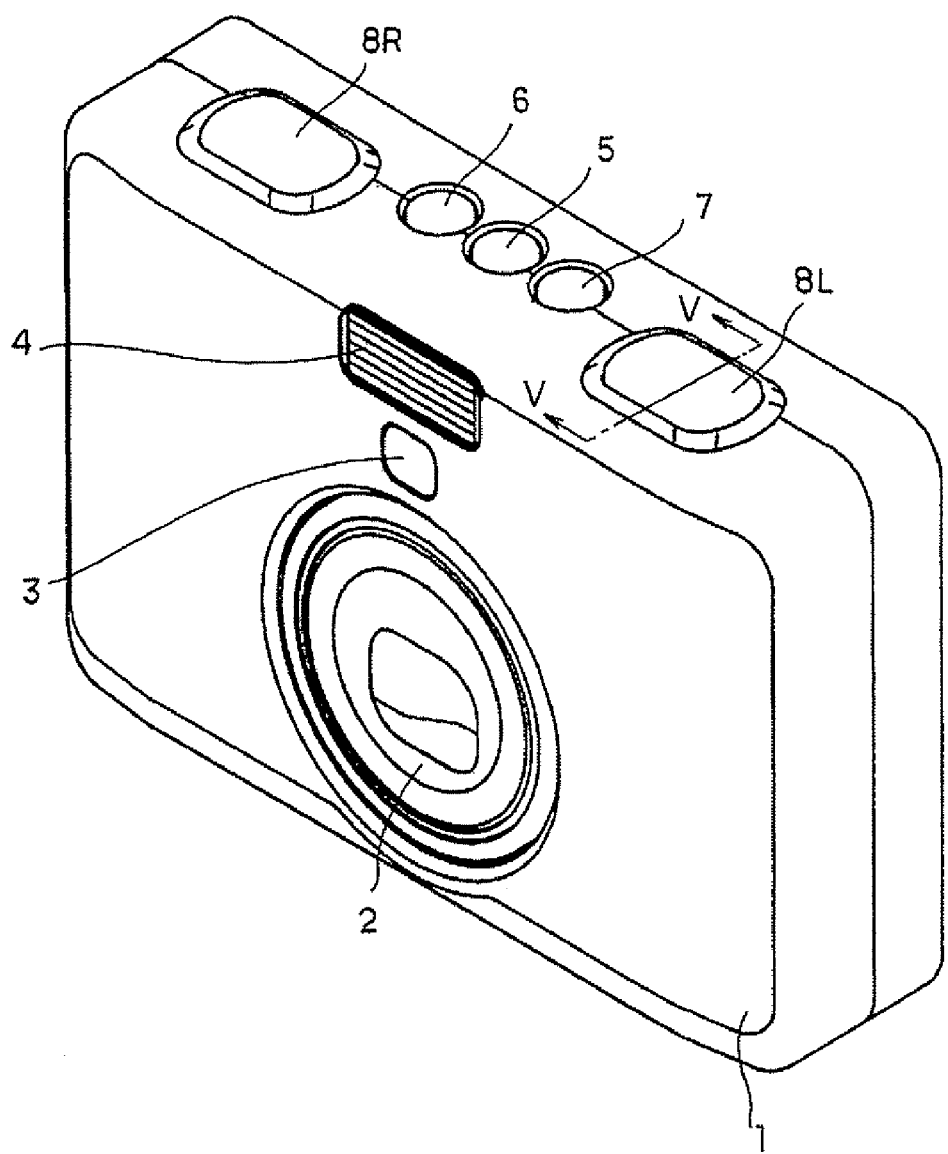
FIG. 1 is a front perspective view of a first embodiment of a digital camera having an electroluminescent display device according to the present invention.
Figure 2:
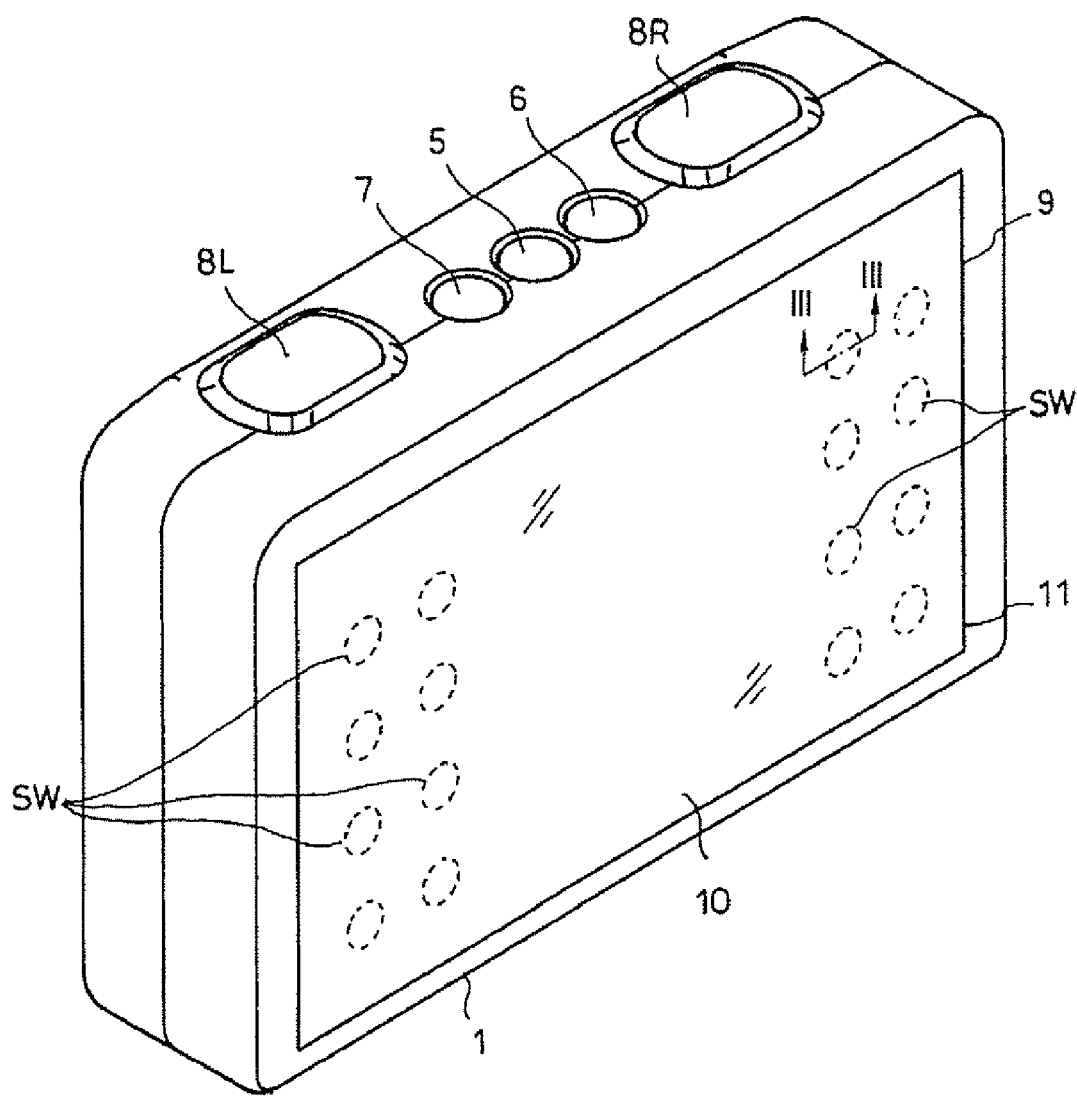
FIG. 2 is a rear perspective view of the digital camera shown in FIG. 1.

FIGS. 1 and 2 are front and rear perspective external views of the first embodiment of a digital camera having an electroluminescent display device according to the present invention, respectively. The digital camera is provided, on the front of a camera body 1 at a substantially center thereof, with a retractable photographing lens (photographing lens barrel) 2. The digital camera is provided, on the front of the camera body 1 above the photographing lens 2, with a self-portrait mirror 3 and a flash 4. The self-portrait mirror 3 is used when the photographer takes a self-portrait picture while visually checking his/her image viewed in the self-portrait mirror 3. The digital camera is provided on the top surface of the camera body 1 with a main switch (main switch button/power switch) 5, a replay button 6 and an EL (electroluminescent) display ON/OFF button 7. The digital camera is provided, on the top surface of the camera body 1 on laterally opposite sides of these three buttons (the main switch 5, the replay button 6 and the EL display ON/OFF button 7), with a right release button 8R and a left release button 8L, respectively. The right release button 8R and the left release button 8L are positioned to correspond to the right and left of the digital camera as viewed from the back of the camera body 1. The right release button BR and the left release button 8L are selectively enabled by a setting operation so that a photographing operation is carried out by depressing either release button 8R or 8L enabled by such a setting operation. As shown in FIG. 2, the digital camera is provided on the back of the camera body 1 with a rectangular monitoring device 9 made to serve as an electroluminescent display device which includes an EL display 10 and a switching board 11. The rectangular display surface of the EL display 10 extends over substantially the entire back surface of the camera body 1. The switching board 11 is positioned immediately inside of the EL display 10 and is provided with a plurality of switches (tactile switches) SW.

Figure 3A:
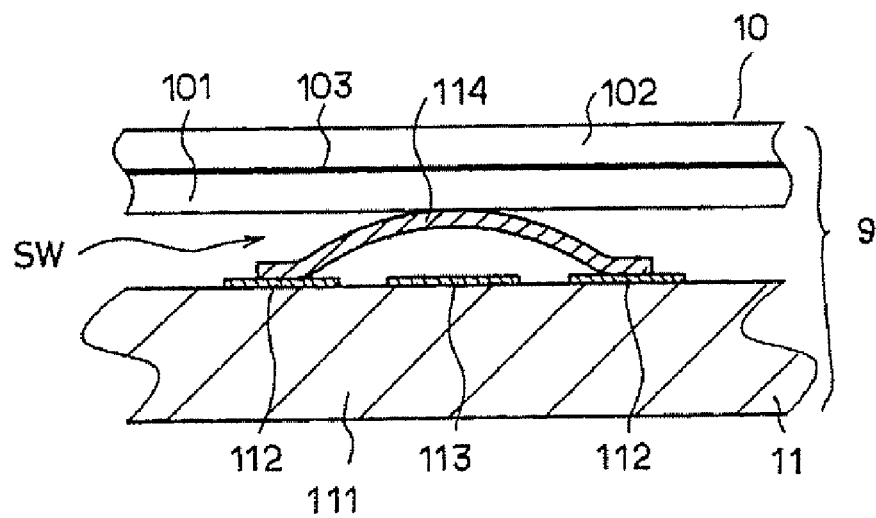
FIG. 3A is an enlarged cross sectional view taken along III-III line shown in FIG. 2, showing a state where a switch is not depressed.
Figure 3B:
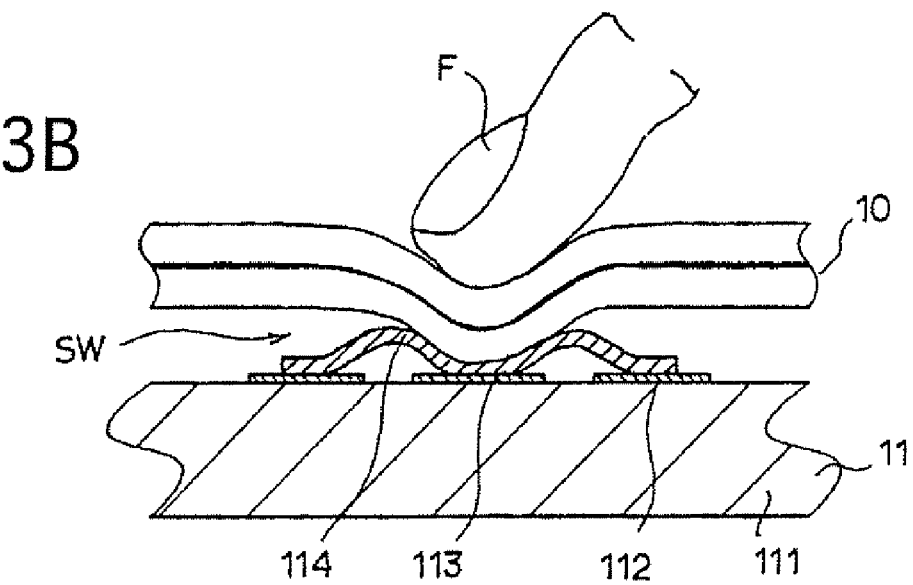
FIG. 3B is an enlarged cross sectional view taken along III-III line shown in FIG. 2, showing a state where a switch is depressed.

FIG. 3A is an enlarged cross sectional view of the monitoring device 9, taken along III-III line shown in FIG. 2. As mentioned above, the monitoring device 9 includes the EL display 10 and the switching board 11 that are positioned on the outer side and inner side of the monitoring device 9, respectively. The switching board 11 is provided with an insulating substrate 111, a plurality of doughnut-shaped switch pads (terminal pads) 112 (only one of them is shown in FIGS. 3A and 3B), a corresponding plurality of central switch pads (terminal pads) 113 (only one of them is shown in FIGS. 3A and 3B) and a predetermined circuit pattern (not shown). The switching board 11 is further provided on the plurality of doughnut-shaped switch pads 112 with a plurality of dome-shaped tactile members (resiliently deformable switch member) 114 (only one of them is shown in FIGS. 3A and 3B), respectively. Each of the plurality of doughnut-shaped switch pads 112 is made of a thin leaf of copper that is formed on the switching board 11. Each of the plurality of central switch pads 113 is also made of a thin leaf of copper that is formed on the switching board 11 at the center of the associated doughnut-shaped switch pad 112. Each of the plurality of tactile members 114 is made of a conductive spring material which is curved in a direction away from the associated central switching pad 113 to have a dome shape in a free state as shown in FIG. 3A. The plurality of doughnut-shaped switch pads 112, the plurality of central switch pads 113 and the plurality of tactile members 114 constitute a plurality of switches SW, respectively. The outer edge of the tactile member 114 of each switch SW is electrically and mechanically connected to the associated doughnut-shaped switch pad 112 so that the tactile member 114 strides over the doughnut-shaped switch pad 112. Each switch SW is turned ON by resiliently deforming a central portion of the associated tactile member 114 until coming in contact with the associated central switch pad 113 by depressing a corresponding outer surface of the EL display 10 by a finger F of the photographer, as shown in FIG. 3B. The plurality of switches SW are arranged at a predetermined plurality of positions on the switching board 11, respectively. In the monitoring device 9 in the first embodiment of the digital camera, eight switches SW are arranged in a matrix having four rows and two columns of switches on each of a right-sided portion and a left-sided portion within the area of the monitoring device 9, as shown in FIG. 2.

Figure 4A:
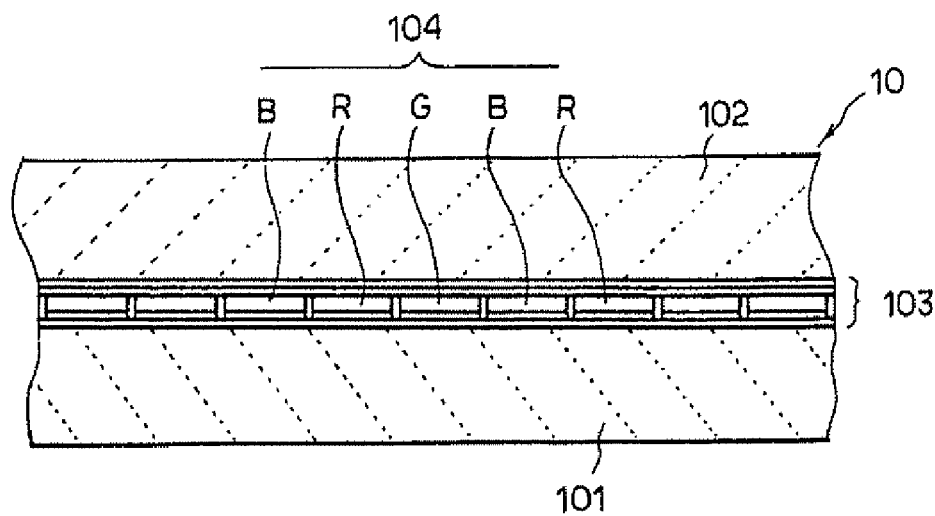
FIG. 4A is an enlarged cross sectional view of a portion of the electroluminescent display device.

The EL display 10 is a full-color EL display which is formed as a sheet having a slight flexibility as a whole. The EL display 10 is provided with an inner film 101, an outer film 102 and an EL portion 103 which is sandwiched between the inner film 101 and the outer film 102. FIG. 4A is an enlarged cross sectional view of a portion of the EL display 10. The inner film 101 is made from an opaque resin film and the outer film 102 is made from a transparent resin film. For example, each of the inner film 101 and the outer film 102 can be made of, one of the following resin materials: PET (polyethylene terephthalate), PES (polyethersulfone), PAr (Polyarylate) and PC (polycarbonate) with a thickness of approximately 75 micrometers.

Figure 4B:
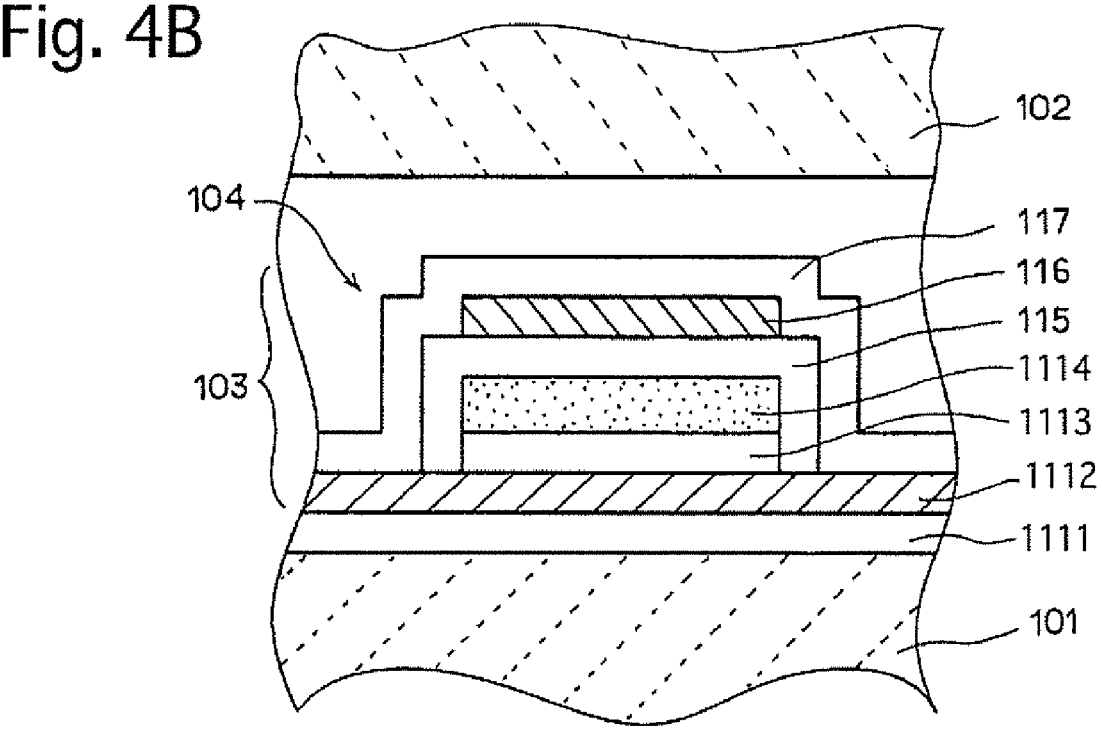
FIG. 4B is an enlarged cross sectional view of a portion of the electroluminescent display device.

The EL portion 103 is formed from a matrix of red (R), green (G) and blue (B) pixels 104 arranged in a plane. As shown in FIG. 4B that shows a portion of one pixel 104, each pixel 104 has a multilayer structure. A moisture-proof barrier film 1111 is formed on an inside surface of the inner film 101 and a electrode film 1112 is formed on the moisture-proof barrier film 1111. In addition, an insulating layer 1113, a luminous layer 1114 and an insulating layer 115 are layered in that order on the electrode film 1112 and correspond to each pixel 104. The electrode film 1112 is a transparent film made of ITO (Indium Tin Oxide), has a thickness of 25 to 100 nanometers and is formed on the moisture-proof barrier film 1111 in a predetermined pattern. Additionally, an outer-side electrode 116 is formed on the insulating layer 115, and thereafter the remaining outer surfaces of the electrode film 1112, the insulating layer 115 and the outer-side electrode 116 are fully coated with a moisture-proof barrier layer 117. The outer-side electrode 116 is a transparent film made of IZO (Indium Zinc Oxide) and has a thickness of 25 to 100 nanometers. Each of the insulating layers 1113 and 115 is made of a silicon dioxide film having a thickness of 0.2 to 0.3 micrometers, and each of the moisture-proof barrier films 1111 and 117 is made of a silicon nitride film having the same degree of thickness as each of the insulating layers 1113 and 115. The luminous layer 1114 has a thickness of 0.5 to 1.0 micrometers. If the luminous layer 1114 is made as inorganic EL, the red pixel is made of CaS:Eu, ZnS:Sm and the like, the green pixel is made of Zn:Tb and the like and the blue pixel is made of SrS:Ce, $CaGa_2S_4$:Ce and the like. If the luminous layer 1114 is made as organic EL, the red pixel is made of $Eu(DBM)_3(Phen)$ (Eu complex), the green pixel is made of Alq (Tris(8-quinolinolato)aluminum) and the blue pixel is made of DPVBi (distyrylarylene derivative).

In the EL display 10, each luminous layer 1114 emits light (red, green and/or blue lights) by applying a high-strength electric field to the luminous layer 1114 by applying a predetermined voltage between the electrode film 1112 and the outer-side electrode 116. Therefore, selectively making the desired pixels 104 emit light makes it possible to cause the EL display 10 to indicate a desired color pattern (color image). Although the EL display 10 becomes transparent when no voltage is applied between the electrode film 1112 and the outer-side electrode 116, the switching board 11 is not visually exposed to the outside of the EL display 10 through the outer surface thereof since the inner film 101 is opaque.

Figure 5A:
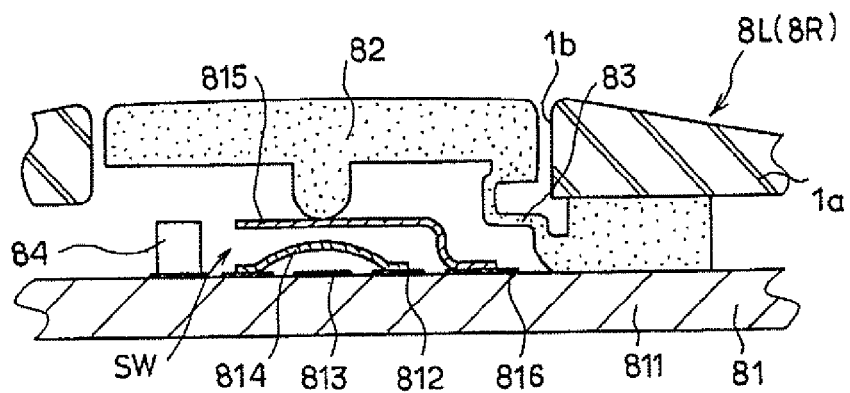
FIG. 5A is an enlarged cross sectional view taken along V-V line shown in FIG. 1, showing a state where a release button is in a free state.

FIG. 5A is an enlarged cross sectional view taken along V-V line shown in FIG. 1, illustrating the structure of each of the right and left release buttons 8R and 8L. Each release button is provided with a push button member 82. The push button member 82 is made of a translucent resin and is mounted on a switching board 81 positioned in the camera body 1 below a top decorative plate 1a thereof. The push button member 82 is provided at one end thereof with a resiliently deformable portion 83 which is held between the switching board 81 and the top decorative plate 1a so that the push button member 82 is supported by the top decorative plate 1a via the resiliently deformable portion 83. A top surface of the push button member 82 is exposed to the outside of the camera body 1 through an opening 1b formed in the top decorative plate 1a so that the photographer can manually depress the push button member 82. The switching board 81 is constructed similarly to the switching board 11 of the monitoring device 9. Namely, a doughnut-shaped switch pad 812 and a central switch pad 813 are formed on an insulating substrate 811 and the outer edge of a dome-shaped tactile member (first switch member) 814 is electrically and mechanically connected to the doughnut-shaped switch pad 812. Another switching pad 816 is formed on the switching board 81 below the push button member 82, and a spring leaf (second switch member) 815 made of a conductive spring material is electrically and mechanically connected at one end thereof to the switching pad 816 to be positioned over the dome-shaped tactile member 814. An LED (light emitting diode/light emitter) 84 which emits light having a predetermined color is mounted on the switching board 81 immediately below the push button member 82.

Figure 5B:
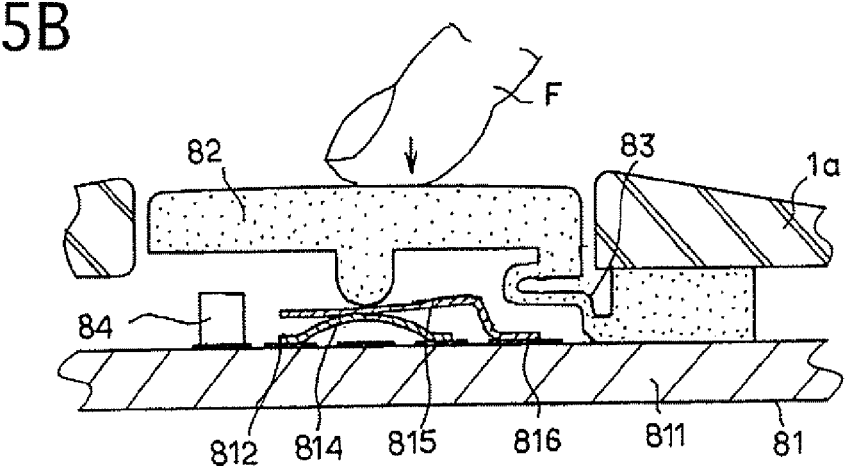
FIG. 5B is an enlarged cross sectional view taken along V-V line shown in FIG. 1, showing a state where the release button is depressed halfway down.
Figure 5C:
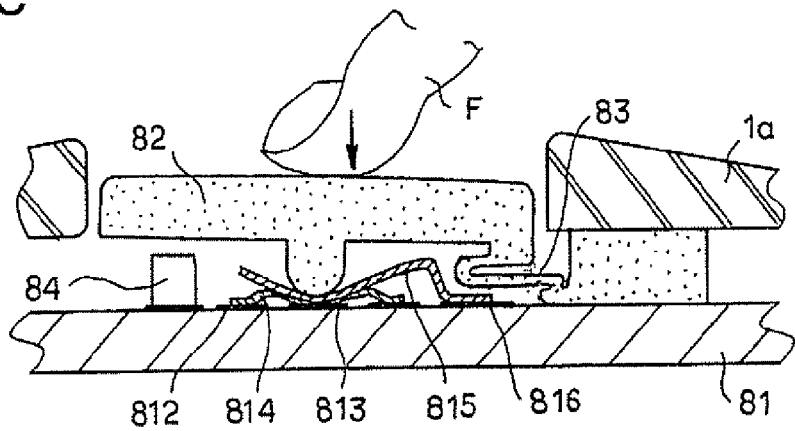
FIG. 5C is an enlarged cross sectional view taken along V-V line shown in FIG. 1, showing a state where the release button is fully depressed.

In each of the right and left release buttons 8R and 8L, depressing the push button member 82 halfway down by the finger F causes the spring leaf 815 to be resiliently deformed downward (inward) so that the spring leaf 815 comes in contact with the dome-shaped tactile member 814 as shown in FIG. 5B, thus causing the switching pad 816 and the switch pad 812 to be electrically connected to each other (to enter an ON state). This switch provided between the switch pads 812 and 816 operates as a photometering switch. Subsequently, fully depressing the push button member 82 causes the tactile member 814 together with the spring leaf 815 to be resiliently deformed downward so that the tactile member 814 comes in contact with the central switch pad 813 as shown in FIG. 5C, thus causing the switching pads 812 and 813 to be electrically connected to each other (to enter an ON state). This switch provided between the switch pads 813 and 812 via the tactile member 814 operates as a shutter release switch. When the LED 84 emits light, this light emission can be visually recognized through the translucent push button member 82 from outside the camera body 1.

Figure 6:
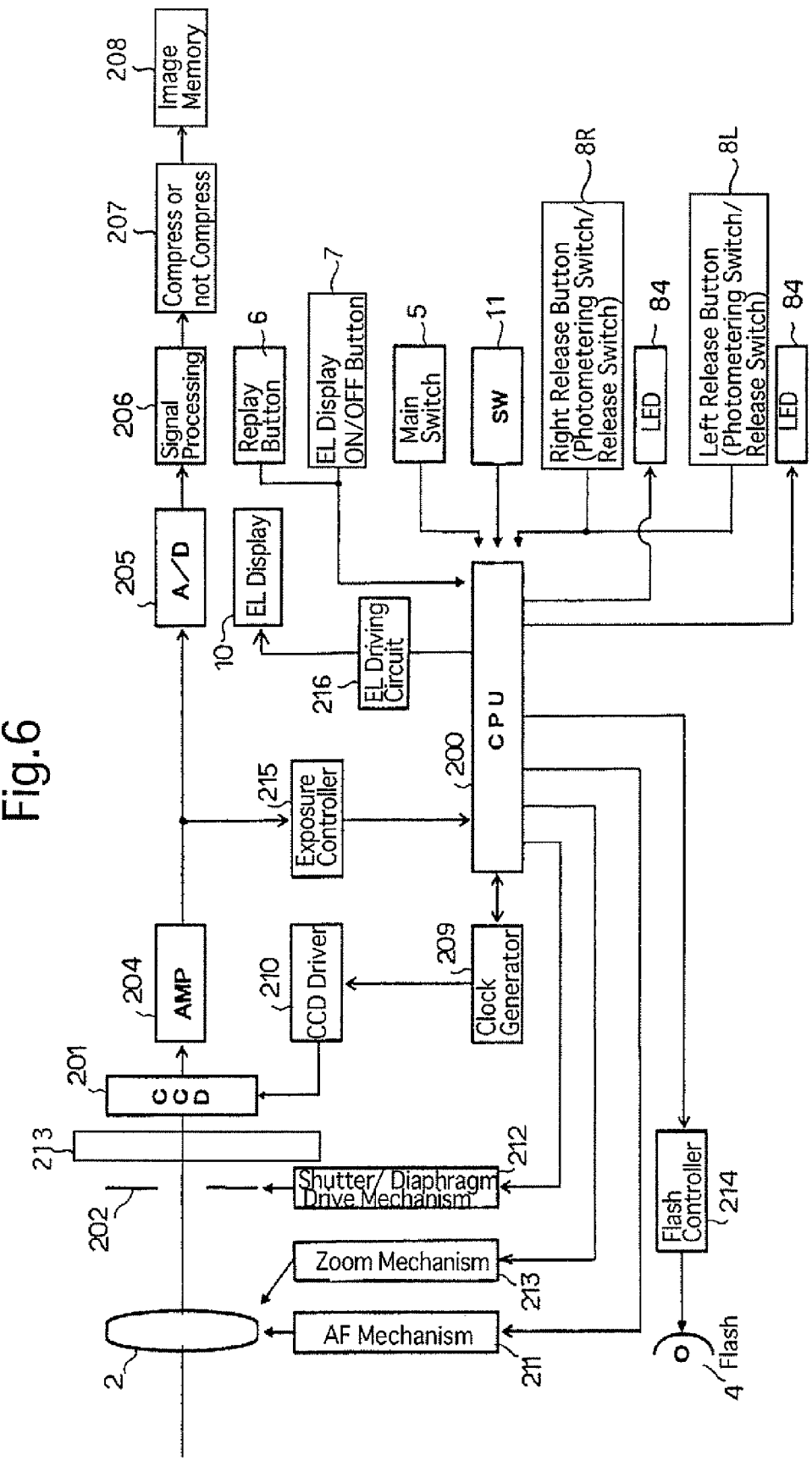
FIG. 6 is a block diagram of components of the first embodiment of the digital camera.

FIG. 6 is a block diagram of components of the first embodiment of the digital camera. An object image formed by the photographing lens 2 therethrough is limited by a diaphragm shutter 202. An image signal of an object which is obtained by an image pickup device 201 (e.g., CCD image sensor) through an optical low-pass filter 203 to be output from the image pickup device 201 is amplified by an amplifier (AMP) 204, and is subsequently converted into a digital signal by an A/D converter 205. This digital signal is subjected to predetermined signal processings such as color processing and a gamma control processing in a signal processing circuit 206. Subsequently, this processed digital signal is compressed or not compressed in a compressing circuit 207 to be written into a VRAM (image memory) 208. It is possible to set an accumulation time (integral action time) of the image pickup device 201 at a time of exposure by controlling the CCD driver 210 via a clock generator 209 by the CPU 200.

The CPU 200 controls an AF (autofocus) drive mechanism 211 based on the imaging signal obtained by the image pickup device 201 when a picture of an object is taken. Additionally, the CPU 200 controls the diaphragm shutter 202, which serves as a shutter and a diaphragm, by controlling a shutter/diaphragm drive mechanism 212. In addition, the CPU 200 controls a zoom mechanism 213 for changing focal length of the photographing lens 2. The CPU 200 also controls a flash controller 214 for controlling the discharge of the flash 4. Additionally, the CPU 200 controls an exposure controller 215 using an imaging signal input from the image pickup device 201 to measure an exposure. The digital camera is provided with an EL driving circuit 216 which drives the EL display 10 to make the EL display 10 indicate object images and predetermined indication patterns. The CPU 200 enables the EL display 10 to indicate such images and indication patterns upon the replay button 6 or the EL display ON/OFF button 7 being operated.

Information on operations of the main switch 5, switch information on the photometering switch and the release switch that are respectively activated upon either release button 8R or 8L being halfway and fully depressed, respectively, and information on operations of each of the replay button 6 and the EL display ON/OFF button 7 are input to the CPU 200. In addition, switch information on the switching board 11 that serves as an element of the monitoring device 9 is enabled to be input to the CPU 200. In the first embodiment of the digital camera, the monitoring device 9 displays a mode setting menu if the EL display ON/OFF button 7 is pressed and held for a predetermined period of time and a desired mode such as a desired photographing mode can be selected from among various modes indicated on the monitoring device 9 by selectively operating the switches SW in accordance with the mode setting menu displayed on the monitoring device 9.

Figure 7:
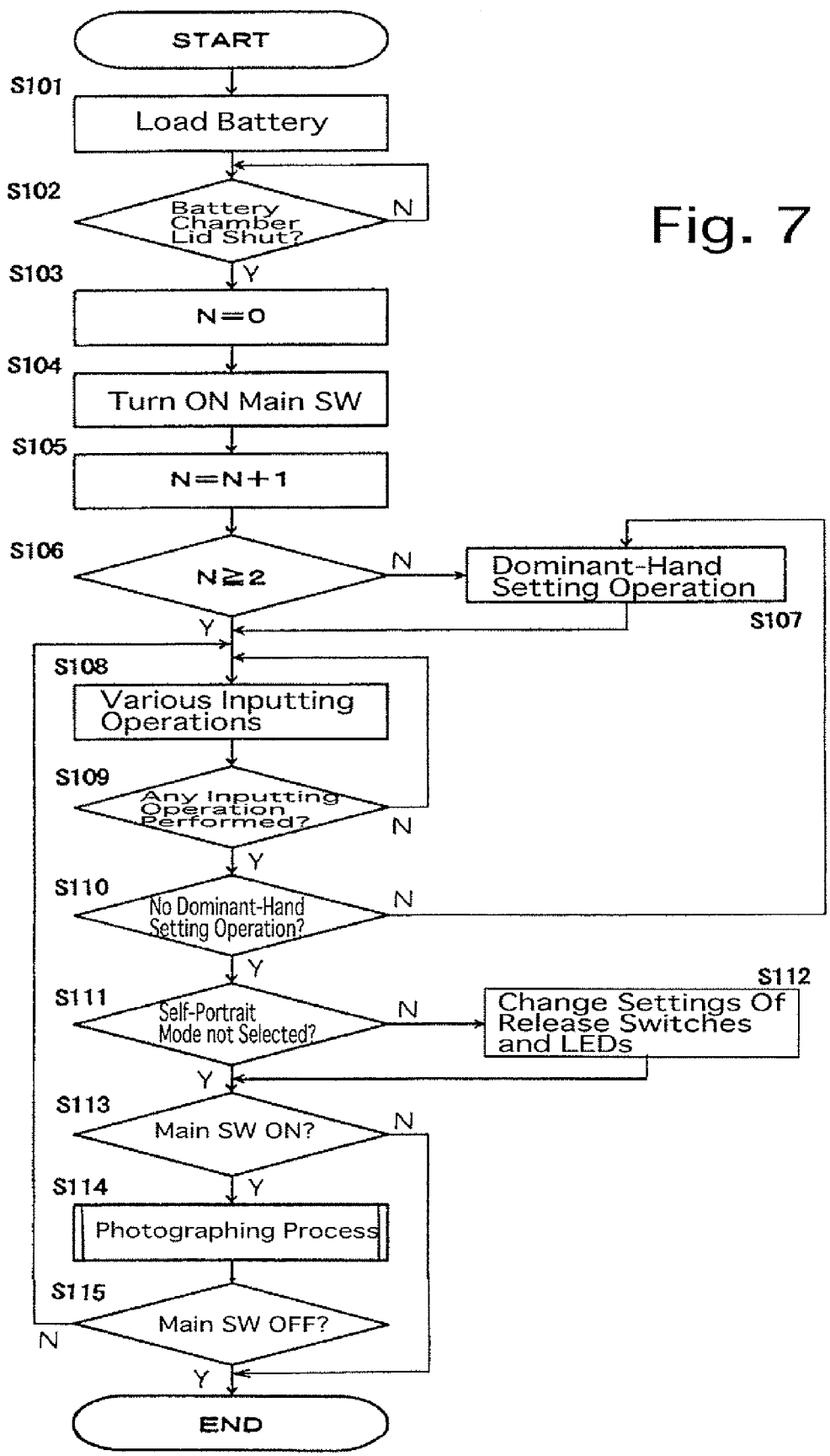
FIG. 7 is a flow chart showing operations of a main routine of the digital camera.

Operations of the digital camera having the above described structure will be hereinafter discussed with reference to the flow charts shown in FIGS. 7 and 8. Upon the battery chamber lid (not shown) of the digital camera being shut with a battery having been loaded in the battery chamber (not shown) (at steps S101 and S102), the CPU 200 sets the value (counter value N) of a built-in counter to zero (N=0) (step S103). Immediately after it is confirmed that the main switch 5 is turned ON (step S104), the counter value N is increased by one (N=N+1). Subsequently, it is determined whether the counter value N is equal to or greater than 2 (step S106). If the counter value N is 1 (if NO at step S106), the photographer is requested to perform a dominant-hand setting operation (step S107). At this time, the monitoring device 9 is forced to indicate a particular screen for the dominant-hand setting operation to prompt the photographer (user) to select either a right-handed mode or a left-handed mode. If it is determined at step S106 that the counter value N is equal to or greater than 2, this means that the dominant-hand setting operation has been already performed, so that the dominant-hand setting operation at step S107 is not performed.

Figure 9A:
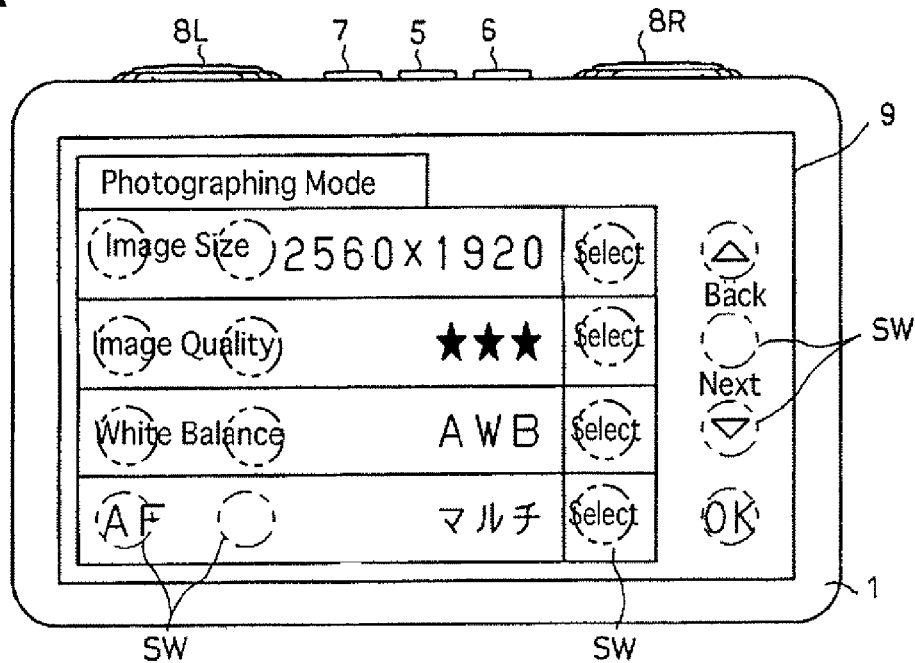
FIG. 9A is a rear elevational view of the digital camera shown in FIG. 1, showing a menu displayed on the monitoring device by way of example.
Figure 9B:
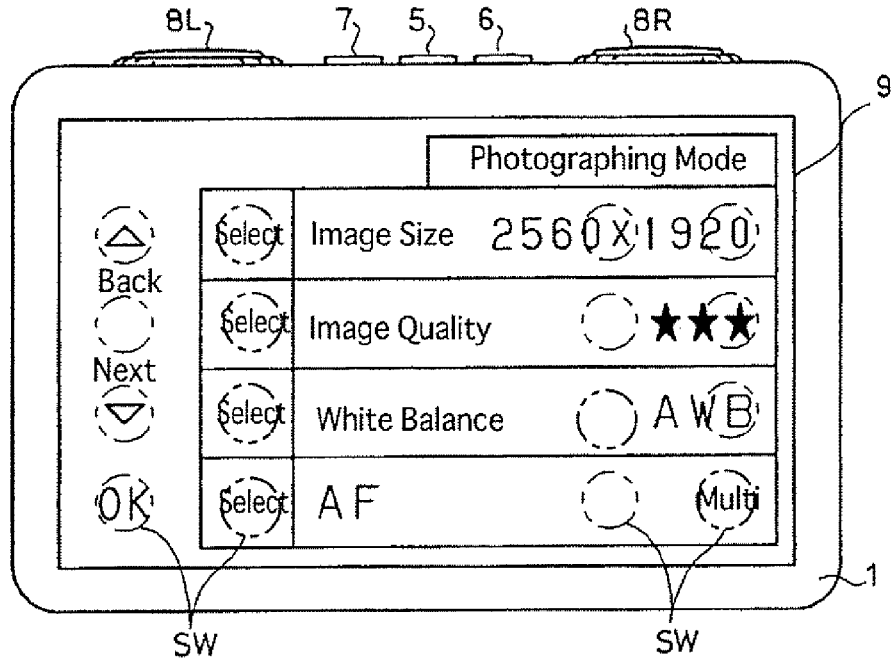
FIG. 9B is a rear elevational view of the digital camera shown in FIG. 1, showing another menu displayed on the monitoring device by way of example.

After the completion of the dominant-hand setting operation, various inputting operations for initialization that include mode setting operations are performed (step S108). In these inputting operations, for instance, if the right-handed mode is selected at step S107, a predetermined photographing mode setting screen is displayed on the monitoring device 9 as shown in FIG. 9A. Specifically, a menu screen is displayed on the left side of this photographing mode setting screen, while a plurality of vertically-aligned on-screen indicators that are assigned to an associated plurality of switches SW to show various functions of the associated plurality of switches SW, respectively, are displayed on the right side of this photographing mode setting screen. The plurality of on-screen indicators are positioned to correspond to an associated plurality of switches SW, so that the photographer can activate each switch SW of the switching board 11 by pressing the surface of the associated on-screen indicator (i.e., a surface of the EL display 10), as shown in FIG. 3B, that is positioned immediately above the switch SW, which makes it possible to carry out various settings. Therefore, it is advantageous for the right-handed photographer to operate the switches SW by their right hand (e.g., the right-hand thumb). On the other hand, if the left-handed mode is selected at step S107, a predetermined photographing mode setting screen is displayed on the monitoring device 9 as shown in FIG. 9B. Specifically, a menu screen is displayed on the right side of this photographing mode setting screen, while a plurality of vertically-aligned on-screen indicators that are assigned to an associated plurality of switches SW to show various functions of the associated plurality of switches SW, respectively, are displayed on the left side of this shooting mode setting screen. In this case, it is advantageous for the left-handed photographer to operate the switches SW by their left hand (e.g., the left-hand thumb).

Upon the dominant-hand setting operation being performed at step S107, if the right-handed mode is selected, the CPU 200 turns ON the LED 84 of the right release button 8R to emit light and so that the photometering switch and the release switch of the right release switch 8R are enabled thereafter. According to this control, the photographer can visually recognize that the right release button 8R illuminated by the associated LED 84 is currently enabled, and therefore, the photographer can take pictures with the right release button 8R while holding the digital camera by their right hand. If the left-handed mode is selected at step S107, the CPU 200 activates the LED 84 of the left release button 8L and makes camera setting change so that the photometering switch and the release switch of the left release switch 8L are enabled.

At step S109 it is determined whether any inputting operation has been performed at step S108. If it is determined that no inputting operation has been performed (if NO at step S109), control returns to step S108. If it is determined that an inputting operation has been performed (if YES at step S109), it is determined whether the dominant-hand setting operation has been performed at step S107 (if the counter value N is not equal to 2) (step S110). If it is determined that the dominant-hand setting operation has been performed (if YES at step S110), it is determined whether or not a self-portrait mode has been selected (step S111). The self-portrait mode can be selected by the photographer at step S108, at which inputting operation are performed. If this self-portrait mode is not selected at step S108 (if YES at step S111), the setting for this mode remains unchanged. However, if this self-portrait mode is selected at step S108 (if NO at step S111), the CPU 200 changes settings on the right and left release buttons 8R and 8L (step S112). Namely, in the case where the right-handed mode has been selected so that the right release button is enabled at step S107, the setting of the digital camera is made to change so that the LED 84 of the right release button 8R and the LED 84 of the left release button 8L are turned OFF and ON, respectively, and so that the photometering switch and the release switch of the left release switch 8L are enabled while the photometering switch and the release switch of the right release switch 8R are disabled from this time on (step S112). Due to this control, the photographer can visually recognize that the left release button 8L illuminated by the associated LED 84 is currently enabled, so that the photographer can take pictures (self-portrait pictures) by operating the left release button 8L by their right hand while holding the digital camera by their right hand with the front of the camera body 1 facing toward the photographer. Conversely, in the case where the left-handed mode has been selected so that the left release button is enabled at step S107, at step S112 the setting of the digital camera is made to change so that the LED 84 of the right release button 8R and the LED 84 of the left release button 8L are turned ON and OFF, respectively, and so that the photometering switch and the release switch of the right release switch 8R are enabled while the photometering switch and the release switch of the left release switch 8L are disabled from this time on. Due to this control, the photographer can visually recognize that the right release button 8R illuminated by the associated LED 84 is currently enabled, so that the photographer can take pictures (self-portrait pictures) by operating the right release button 8R by their left hand while holding the digital camera by their left hand with the front of the camera body 1 facing toward the photographer. Thereafter, it is determined whether the main switch 5 is ON (step S113). If it is determined that the main switch 5 is ON (if YES at step S113), control proceeds to step S114 at which the CPU 200 performs a photographing process. Thereafter, it is determined whether the main switch 5 is OFF (step S115). If it is determined that the main switch 5 is not OFF (if NO at step S115), the control returns to step S108. If it is determined that the main switch 5 is OFF (if YES at step S115), controls ends.

Figure 8:
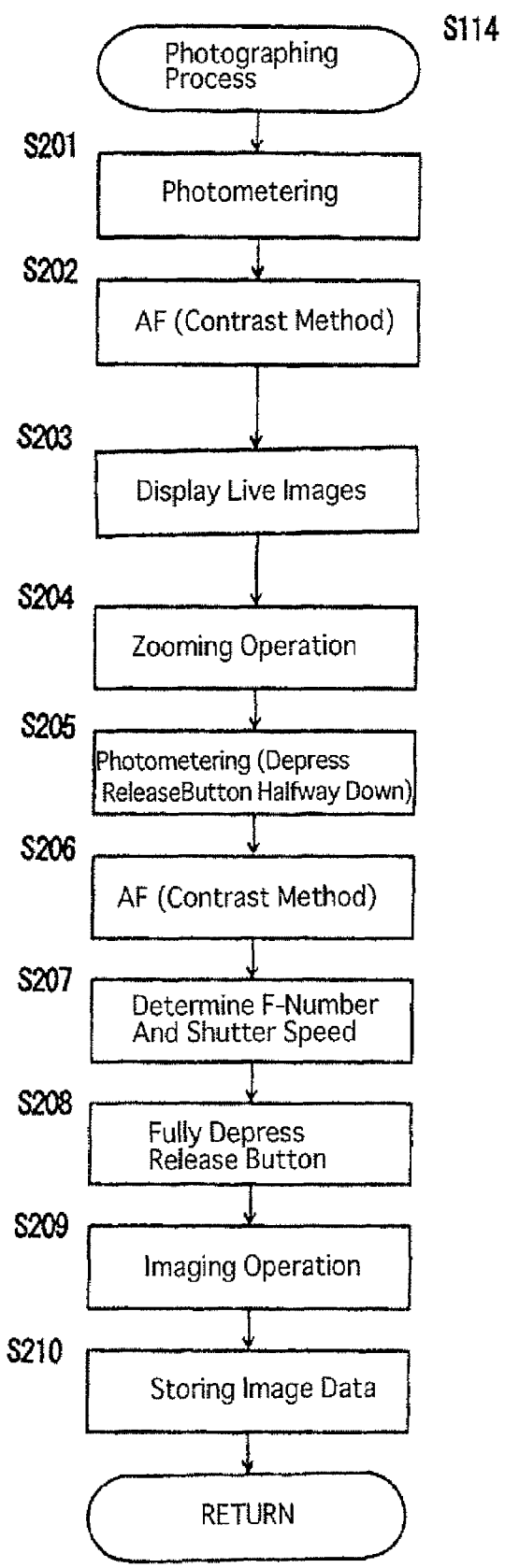
FIG. 8 is a flow chart showing operations of a sub-routine "photographing process" shown in FIG. 7.
Figure 10A:
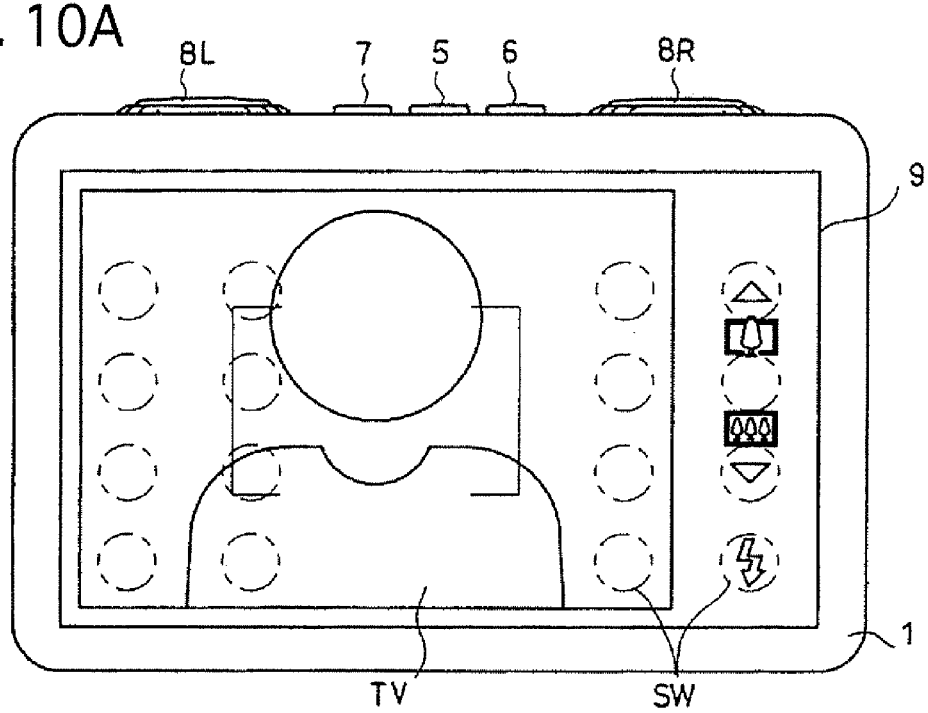
FIG. 10A is a rear elevational view of the digital camera shown in FIG. 1, showing a manner of displaying live images on the monitoring device by way of example.

As shown in FIG. 8, in the photographing process, a photometering operation is performed in the exposure controller 215 (step S201). Subsequently, the AF drive mechanism 211 is driven to adjust the focus of the photographing lens 2 via a contrast method based on object image captured by the image pickup device 201 (step S202). Subsequently, live object images (video images) captured by the image pickup device 201 are displayed on the EL display 10 (step S203). At this time, in the case where the digital camera is set at the right-handed mode, the CPU 200 operates so that live images TV and various on-screen indicators (on-screen icons) are displayed on the left side and the right side of the monitoring device 9 as viewed from the back of the monitoring device 9, respectively, as shown in FIG. 10A, wherein the various on-screen indicators include a telephoto zoom indicator (∇) and a wide zoom indicator (∆) for actuating the zoom mechanism 213, and also includes a flash indicator. These on-screen indicators are positioned to correspond to associated switches SW of the switching board 11. Therefore, while holding the camera body 1 by the right hand, the photographer can change the zoom setting (focal length setting) and the flash setting by manually operating these on-screen indicators by the right hand (e.g., the right hand thumb). The zoom setting for the zooming mechanism 213 is made by a zooming operation performed by the photographer using the screen shown in FIG. 10A that is displayed on the monitoring device 9, and thereupon the live images TV displayed on the left side of the monitoring device 9 are those taken at the set focal length (step S204).

Figure 10B:
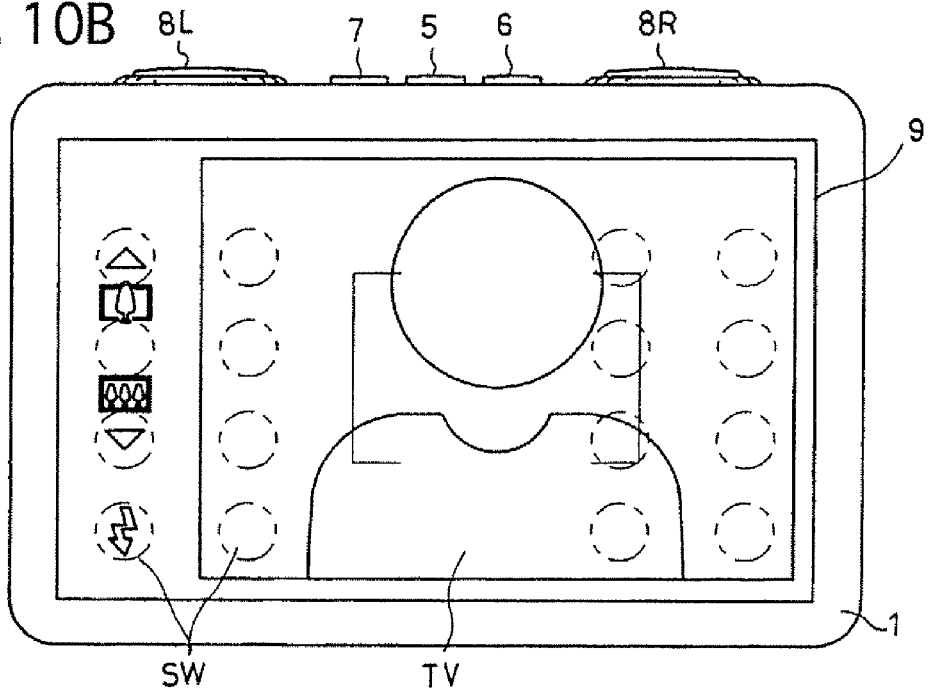
FIG. 10B is a rear elevational view of the digital camera shown in FIG. 1, showing another manner of displaying live images on the monitoring device by way of example.

If the digital camera is set at the left-handed mode, the live images TV and the various on-screen indicators (the telephoto zoom indicator, the wide zoom indicator and the flash indicator) are displayed on the right side and the left side of the monitoring device 9 as viewed from the back of the monitoring device 9, respectively, as shown in FIG. 10B. Therefore, while holding the camera body 1 by the left hand, the photographer can change the zoom setting and the flash setting by manually operating these on-screen indicators by the left hand (e.g., the left hand thumb).

Thereafter, upon the photometering switch being turned ON by a halfway depression of the release button 8R or 8L, the CPU 200 operates to perform a photometering operation (step S205) and to perform a focusing operation via an AF contrast method (step S206). Subsequently, the CPU 200 determines an f-number (an aperture value) and a shutter speed (step S207). Subsequently, upon the release button 8R or 8L being fully depressed (step S208), the CPU 200 performs a process obtaining an image from the imaging signal of an object captured by the image pickup device 201 and simultaneously causes the monitoring device 9 to display the captured object image (step S209). Moreover, data on the obtained object image is stored in memory (step S210). This stored image can be reproduced to be displayed on the monitoring device 9 by operating the replay button 6. Thereafter, control proceeds to step S115 (see FIG. 7) at which it is determined whether the main switch is OFF. Control returns to step S108 if the main switch is ON (if NO at step S115). Control ends if the main switch is OFF (if YES at step S115).

As can be understood from the above description, in the first embodiment of the digital camera, a reduction in size of the monitoring device 9 can be avoided, or no reduction in the size of the monitoring device 9 may be necessary at all, even if the camera body 1 is miniaturized, since the display area of the monitoring device 9 is formed to extend over substantially the entire back surface of the camera body 1, which makes it easy for the photographer to frame the object image while looking through the monitoring device 9 and also makes it easy for the photographer to visually check the focus of reproduced object images. Additionally, many different types of switches can be achieved by a few number of multi-functional switches since each switch SW can be assigned to various on-screen indicators showing functions of associated switches, which makes it possible for the operating switches to be arranged sufficiently spaced from one another, thus improving the operability of the various operating switches. Specifically, the photographer can perceive the activation of each switch SW through their finger(s) because the dome-shaped tactile member 114 of each switch SW is resiliently deformed to turn the switch SW ON and OFF when the photographer activates the switch SW by pressing a surface of the EL display 10, which makes it possible for the photographer to make sure that the switch SW operates properly, and makes it possible to prevent a wrong operation from occurring and provides confidence in the reliably of the switches SW. Furthermore, it possible to display large-sized on-screen indicators on the monitoring device to make the switches (tactile switches) SW easy to read. Moreover, in the first embodiment of the digital camera, since the left release button 8L and the right release button 8R are provided on left and right sides of the camera body 1, respectively, and since the left release button 8L and the right release button 8R are selectively enabled by a predetermined setting operation, a photographing operation is not dependent on the dominant hand of the photographer. Furthermore, the operability of the digital camera can be improved even in the case of taking self-portrait pictures while the operability of various operating switches such as mode select switches can be improved.

In the first embodiment of the digital camera, the right and left release buttons are selectively enabled based on the dominant-hand setting operation and the self-portrait mode as described above. However, it is possible for the CPU 200 to determine which of the right and left release buttons 8R and 8L has been depressed and for the CPU 200 to operate so as to make the monitoring device 9 display object images, and for a plurality of on-screen indicators to be assigned to a plurality of switches SW in an indication pattern corresponding to the release button determined by the CPU 200 without performing or setting either the dominant-hand setting operation or the self-portrait mode. This control also makes it easy for the photographer to take pictures in each case where the photographer is right-handed or a left-handed, and even in the self-portrait mode.

Second Embodiment

Figure 11:
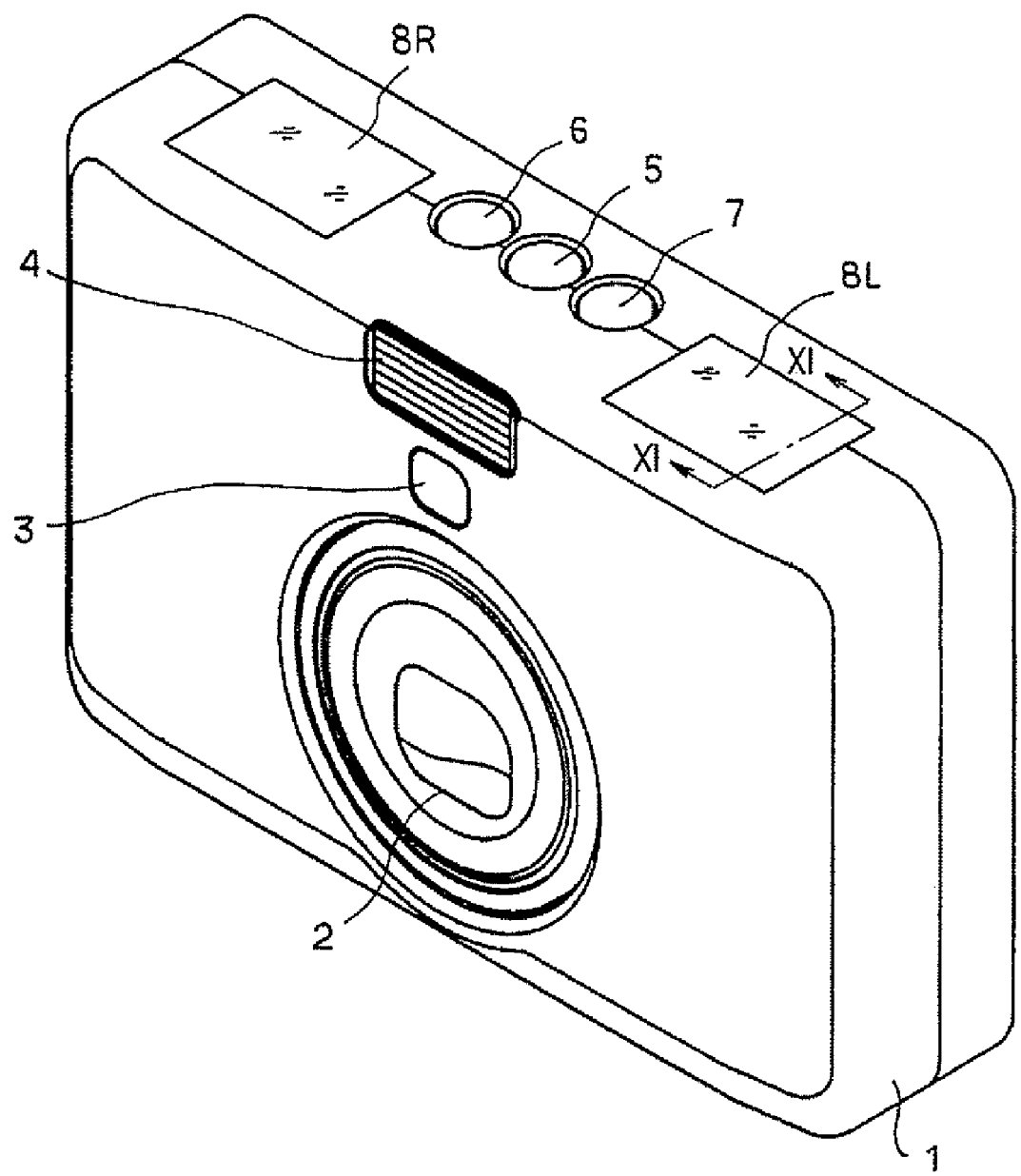
FIG. 11 is a front perspective view of a second embodiment of the digital camera having an electroluminescent display device according to the present invention.
Figure 12:
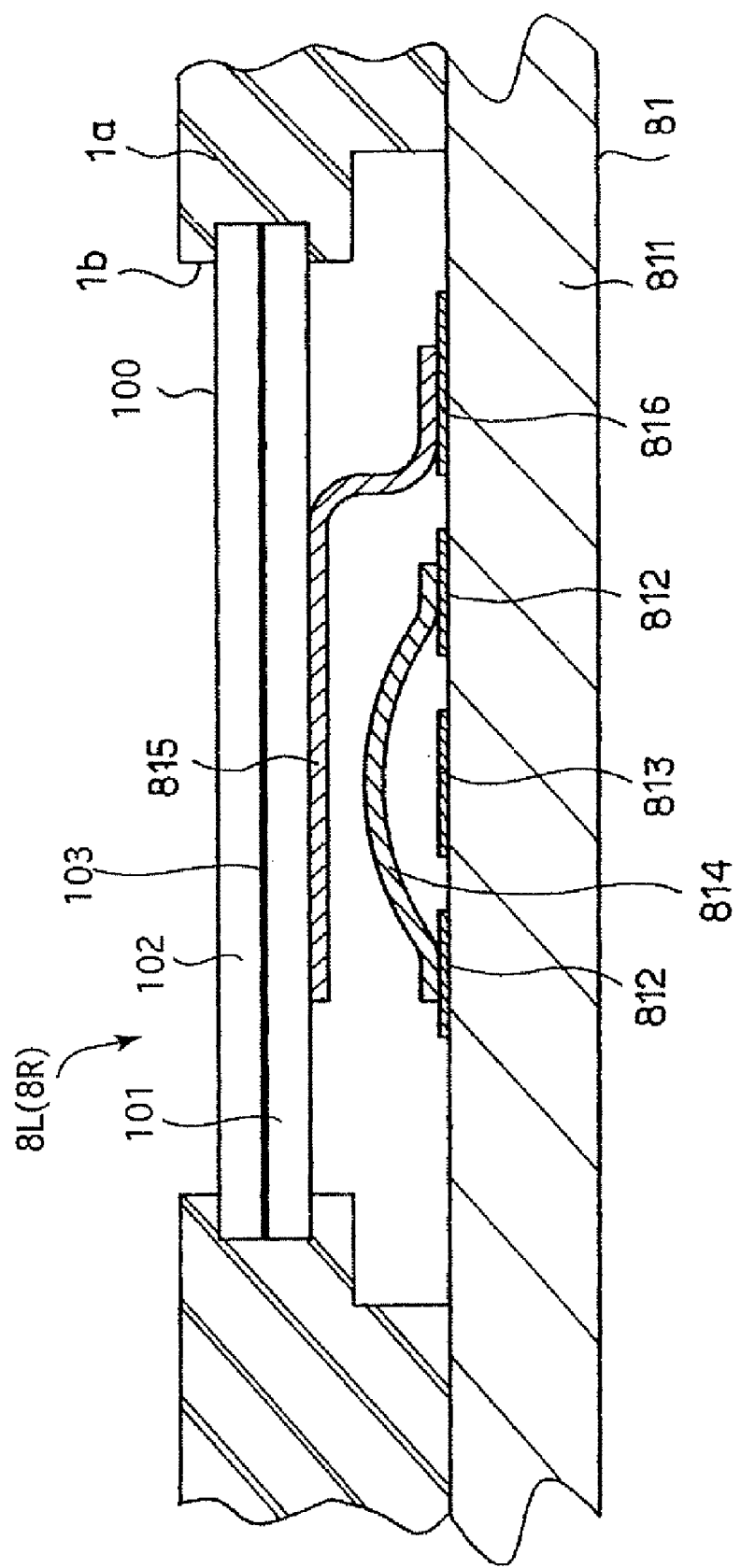
FIG. 12 is an enlarged cross sectional view taken along XI-XI line shown in FIG. 11.

FIG. 11 is a front perspective view of the second embodiment of the digital camera, wherein portions and elements similar to those in the first embodiment of the digital camera shown in FIG. 1 are designated by the same reference numerals. In the second embodiment of the digital camera, each of the right and left release buttons 8R and 8L is composed of an EL display and a switch positioned immediately below the EL display, and which of the right and left release buttons is currently enabled is visually indicated by the associated EL display. FIG. 12 is an enlarged cross sectional view taken along an XI-XI line shown in FIG. 11. In FIG. 12, the release button 8L (8R) is provided with an EL display 100 (instead of the push button member 82 of the first embodiment) and is further provided immediately below the EL display 100 with a switching board 81 which is the same as the switching board 81 provided in the first embodiment of the digital camera. The EL display 100 is similar in structure to the EL display 10 provided in the first embodiment of the digital camera. The EL display 100 is fixedly fitted in an opening 1b formed in the top decorative plate 1a to be supported thereby. Elements provided on the switching board 81 are designated by the same reference numerals as corresponding elements provided on the switching board 81 of the first embodiment of the digital camera. Namely, the dome-shaped tactile member 814 made of a conductive spring material is mounted on the insulating substrate 811 on which the insulating substrate 811, the central switch pad 813 and the switching pad 816 are formed, and the spring leaf 815 that is positioned above the tactile member 814 is in contact with the inner film 101 of the EL display 100. The tactile member 814 and the spring leaf 815 constitute a photometering switch, and the tactile member 814 and the central switch pad 813 constitute a shutter release switch.

In the second embodiment of the digital camera, the right and left release buttons 8R and 8L can be selectively enabled by an operation of the user. Upon either of the right and left release buttons 8R and 8L being enabled, the EL display 100 of the enabled release button 8R or 8L is activated to either emit light or display a predetermined indication so that the photographer can visually recognize which of the right and left release buttons is currently enabled. By pressing, with the photographer's finger, etc., the EL display 100 which emits light or displays a certain indication, causes the spring leaf 815 to be resiliently deformed downward (inward) so that the spring leaf 815 comes in contact with the dome-shaped tactile member 814 (in a similar manner to that of the first embodiment as shown in FIG. 5B) to thereby turn ON the photometering switch, and further pressing the same EL display 100 causes the tactile member 814 together with the spring leaf 815 to be resiliently deformed downward so that the tactile member 814 comes in contact with the central switch pad 813 (in a similar manner to that of the first embodiment as shown in FIG. 5C) to thereby turn ON the release switch. According to this structure, the EL display 100 can be used to serve as both the translucent push button member 82 and the LED 84 provided in the first embodiment of the digital camera, which makes it possible to simplify the structure of the digital camera. In this case, since the spring leaf 815 and the tactile member 814 are resiliently deformed in that order to actuate the photometering switch and the release switch when the EL display 100 is depressed to be resiliently deformed downward, the photographer can feel a tactile "click" response from the EL display 100 when the EL display 100 is depressed halfway down to actuate the photometering switch and when the EL display 100 is fully depressed to actuate the release switch, which makes it possible for the photographer to reliably operate the photometering switch and the release switch. Additionally, it is possible to make either of the right and left release button 8R and 8L which is disabled to serve as a different functional switch button temporarily by appropriately changing the indication displayed on the EL displays 100 of the disabled release button 8R or 8L.

Similar to the first embodiment of the digital camera, in the second embodiment of the digital camera, a reduction in size of the monitoring device 9 can be avoided, or no reduction in the size of the monitoring device 9 may be necessary at all, even if the camera body 1 is miniaturized since the display area of the monitoring device 9 is formed to extend over substantially the entire back surface of the camera body 1, which makes it easy for the photographer to frame the object image while looking through the monitoring device 9 and also makes it easy for the photographer to visually check the focus of reproduced object images. Additionally, many different types of switches can be achieved by a small number of multi-functional switches since each switch SW can be assigned to various on-screen indicators, which makes it possible for the operating switches to be arranged to be sufficiently spaced from one another, thus improving the operability of the various operating switches. Even in this case, the photographer can feel a tactile "click" response from each switch. Additionally, since the left release button 8L and the right release button 8R are provided on left and right sides of the camera body 1, respectively, and also since the left release button 8L and the right release button 8R are selectively enabled by a predetermined setting operation, a photographing operation is not dependent on the dominant hand of the photographer. Moreover, the operability of the digital camera can be improved even in the case of taking self-portrait pictures, and the operability of various operating switches such as mode select switches can be improved. Specifically, since the enabled release button is visually indicated by an operation of the associated EL display, the enabled release button can be visually checked reliably, which also prevents the photographer from missing a chance of releasing the shutter at the right moment.

Although the present invention is applied to a lens shutter type of digital camera in the above illustrated embodiment, the EL display device according to the present invention can also be applied to a single-lens-reflex digital camera for enlarging a monitoring device on the camera.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A digital camera, comprising:
    an electroluminescent display;
    a plurality of switches which are positioned adjacent to an inner surface of said electroluminescent display, each of said switches being activated upon an outer surface of said electroluminescent display being pressed to resiliently deform said switch, said plurality of switches comprising one or more switches provided at a right side of said electroluminescent display, and one or more switches provided at a left side of said electroluminescent display;
    a right release button provided on a right portion of a body of said digital camera; and
    a left release button provided on a left portion of said body,
    wherein said digital camera is configured to operate in a right-handed mode and a left-handed mode, based on a dominant-hand setting operation, and
    when said digital camera operates in said right-handed mode, said right release button is enabled, and said electroluminescent display displays one or more function indicators corresponding to said one or more switches at said right side of said electroluminescent display, and
    when said digital camera operates in said left-handed mode, said left release button is enabled, and said electroluminescent display displays one or more function indicators corresponding to said one or more switches at said left side of said electroluminescent display.

2. The digital camera according to claim 1, wherein said electroluminescent display is flexible so that in the case where said outer surface of said electroluminescent display is depressed, a depressed portion thereof is deformed so that an inner surface of said depressed portion operates one of said plurality of switches.

3. The digital camera according to claim 2, wherein said electroluminescent display displays each of said function indicators at an area at which a switch is operated upon said electroluminescent display being depressed.

4. The digital camera according to claim 2, wherein an inner layer of said electroluminescent display adjacent to a switch is made of an opaque material.

5. The digital camera according to claim 3, wherein each of said function indicators indicates a function which is performed when a corresponding switch which is operated.

6. The digital camera according to claim 1, wherein said electroluminescent display device displays object images captured via an image pickup device, and extends over substantially an entire surface of said body of said digital camera.

7. The digital camera according to claim 6, wherein said electroluminescent display displays information on various modes of said digital camera.

8. The digital camera according to claim 1, wherein each of said switches comprises:
    an insulating substrate;
    at least one switch pad formed on a surface of said insulating substrate; and
    a resiliently deformable switch member which is resiliently deformed to come in contact with said switch pad when said resiliently deformable switch member is depressed toward said switch pad.

9. The digital camera according to claim 8, wherein said resiliently deformable switch member comprises a dome-shaped tactile member.

10. The digital camera according to claim 1, wherein said digital camera visually indicates the release button which is enabled.

11. The digital camera according to claim 10, wherein each of said right release button and said left release button comprises a light emitter, and
    wherein said light emitter of the release button which is enabled emits light.

12. The digital camera according to claim 1, wherein each of said right release button and said left release button comprises a second flexible electroluminescent display and a switch positioned adjacent to an inner surface of said second flexible electroluminescent display, and wherein said second flexible electroluminescent display of one of said right release button and said left release button which is enabled is made to display an indication indicating that said one of said right release button and said left release button is currently enabled.

13. The digital camera according to claim 1, wherein each of said right release button and said left release button comprises:

a push button member made of a translucent resin; and a light emitter which illuminates said push button member when the associated one of said right release button and said left release button is enabled.

14. The digital camera according to claim 1, wherein said right release button and said left release button are provided on the top of said camera body, and wherein said electroluminescent display is provided on the back of said camera body.

15. The digital camera according to claim 1, further comprising a self-portrait mirror fixed to a front surface of said camera body.

* * * * *